US007909733B2

(12) United States Patent
Imediegwu

(10) Patent No.: US 7,909,733 B2
(45) Date of Patent: Mar. 22, 2011

(54) CLUTCH END-OF-FILL DETECTION STRATEGY

(75) Inventor: Chino Imediegwu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 561 days.

(21) Appl. No.: 11/963,204

(22) Filed: Dec. 21, 2007

(65) Prior Publication Data

US 2009/0159389 A1 Jun. 25, 2009

(51) Int. Cl.
*F16H 61/00* (2006.01)

(52) U.S. Cl. .......................................................... 477/143

(58) Field of Classification Search ......................... None
See application file for complete search history.

(56) References Cited

U.S. PATENT DOCUMENTS

| | | | | |
|---|---|---|---|---|
| 3,856,047 | A | 12/1974 | Takayama | |
| 4,465,168 | A | 8/1984 | Sato | |
| 4,911,469 | A | 3/1990 | Kawarasaki | |
| 5,046,174 | A | 9/1991 | Lentz et al. | |
| 5,119,695 | A | 6/1992 | Milunas et al. | |
| 5,580,332 | A | 12/1996 | Mitchell et al. | |
| 5,913,577 | A * | 6/1999 | Arndt | 303/117.1 |
| 5,941,358 | A | 8/1999 | Hosseini et al. | |
| 6,088,645 | A | 7/2000 | Kawasaki et al. | |
| 6,115,661 | A | 9/2000 | Hosseini et al. | |
| 6,205,875 | B1 | 3/2001 | Eike et al. | |
| 6,292,732 | B1 | 9/2001 | Steinmetz et al. | |
| 6,357,229 | B1 | 3/2002 | Schust et al. | |
| 6,640,950 | B2 | 11/2003 | Harvey et al. | |
| 6,799,108 | B2 | 9/2004 | Aldrich, III et al. | |
| 6,915,890 | B1 | 7/2005 | Whitton et al. | |
| 7,043,347 | B2 | 5/2006 | Inoue et al. | |
| 7,051,856 | B2 | 5/2006 | Hessell et al. | |
| 7,066,862 | B2 * | 6/2006 | Bothe et al. | 477/143 |
| 2006/0089775 | A1 | 4/2006 | Whitton et al. | |
| 2007/0051580 | A1 | 3/2007 | Gunderson et al. | |
| 2007/0287582 | A1 * | 12/2007 | Steinhauser et al. | 477/71 |

FOREIGN PATENT DOCUMENTS

| | | |
|---|---|---|
| EP | 1285806 | 2/2003 |
| JP | 10110858 | 4/1998 |

OTHER PUBLICATIONS

Marano et al., "Clutch to cluth transmission control strategy," SAE Technical Paper Series 2007-01-1313 (SAE International 2007 World Congress, Detroit, Michigan, USA, Apr. 16-19, 2007).

* cited by examiner

*Primary Examiner* — David D Le
*Assistant Examiner* — Justin Holmes
(74) *Attorney, Agent, or Firm* — Leydig, Voit & Mayer

(57) ABSTRACT

A system and method for controlling a hydraulic transmission uses a solenoid valve having a pressure sensor linked to the valve body operable to sense a hydraulic fluid pressure within a cavity of the valve body and to transmit an electrical signal based on the sensed pressure. The transmitted signal is used to identify the end of fill time, and thus to end a clutch fill phase and commence a clutch modulation or lock-up phase.

19 Claims, 5 Drawing Sheets

CLUTCH END-OF-FILL DETECTION STRATEGY

TECHNICAL FIELD

This disclosure relates generally to systems and methods for enabling robust clutch fill control and calibrating a hydraulic transmission clutch and, more particularly, to systems and methods for calibrating the flow of a pressurized operating medium within a clutch-controlled transmission.

BACKGROUND

Hydraulic clutches are well known in general, and can be found in many systems and devices. In one implementation, a set (plurality) of hydraulic clutches are used to facilitate shifting of a transmission between differing input/output gear ratios or ratio ranges. More generally, a transmission typically includes an input shaft, an output shaft, and a collection of interrelated gear elements, such as in a planetary arrangement or otherwise, usable to selectively couple the input and output shafts. The clutches may be used to select gear ratios in a discrete transmission, and to select gear ratio ranges in a continuous transmission. Both types of coupling will be referred to herein as "ratios."

The selection of a gear ratio at the output shaft is executed via one or more clutches that affect the rotations and/or interrelationships of the gear elements. The clutches are typically hydraulically actuated to engage band or disk torque transfer elements. Shifting from one gear ratio to another normally involves releasing or disengaging an off-going clutch or clutches associated with the current gear ratio and applying or engaging an on-coming clutch or clutches associated with the desired gear ratio. By way of example, although many different clutch arrangements are possible within such transmissions, one possible arrangement is a two-clutch shifting transmission. In this arrangement, two clutches are required to hold a specific gear in said transmission. Typically, this entails a primary clutch, often a rotating clutch element, which is retained for an upcoming gear, and a secondary clutch that is disengaged in order to shift into the upcoming gear. The secondary clutch for this shift condition is referred to in the art as the off-going clutch. This clutch is replaced by a new clutch, the "on-coming" clutch, required to actuate the transmission into the new gear. In other words, a shift is executed by deactivating a single "off-going" clutch, activating a single "on-coming" clutch, and holding a third clutch for both the old and new gears. In other arrangements, multiple on-coming and\or off-going clutches are employed, increasing the complexity and criticality of clutch actuation timing.

Each hydraulic clutch is typically driven via an electrically controlled solenoid valve. Such solenoid valves are electrically modulated to control hydraulic fluid pressure to the clutch and hence to control the clutch piston movement during the clutch fill phase.

The phasing of the on-coming and off-going clutch element can have a substantial impact on the perceived shift quality. For example, if the off-going clutch disengages prematurely, the engine speed may surge briefly before the on-coming clutch, still in the fill phase, possesses sufficient torque capacity. Furthermore, if the on-coming clutch fills prematurely, the clutch element has sufficient torque capacity before the off-going clutch is ready to commence torque transfer. This can lead to a three-way clutch tie up which is detrimental to the transmission's useful life in a mild case, and often results in mechanical damage to the transmission in an extreme case. Conversely, in the event of a late clutch fill, the off-going clutch hands off torque to the on-coming clutch before the on-coming clutch has sufficient torque capacity, and the transmission slips as the on-coming clutch does not have sufficient time to lock with adequate torque capacity to hold the specific gear in question. The end result is a slip phenomenon in the clutch discs, also an undesirable event as this tends to produce high clutch energies resulting from excessive heat generation produced by the higher clutch relative velocities of the rotating clutch discs. In addition to creating an unpleasant user experience, badly timed shifting will over time, impact the efficiency and service life of the transmission. To this end, it is desirable to actuate the clutches with precision such that a smooth shift occurs throughout the entire operating speed range of the transmission during its entire useful life.

Known methods for calibrating transmission clutches tend to be empirical rather than contemporaneous. In other words, the behavior of the clutch may be observed at some point, and conclusions may be drawn as to how the clutch reacts to hydraulic flow. These observations are then used to periodically "calibrate" the clutch. However, the condition and operating environment of a clutch can change substantially between calibration intervals, resulting in a degradation of shift quality.

Although the resolution of deficiencies, noted or otherwise, of the prior art has been found by the inventors to be desirable, such resolution is not a critical or essential limitation of the disclosed principles. Moreover, this background section is presented as a convenience to the reader who may not be of skill in this art. However, it will be appreciated that this section is too brief to attempt to accurately and completely survey the prior art. The preceding background description is thus a simplified and anecdotal narrative and is not intended to replace printed references in the art. To the extent an inconsistency or omission between the demonstrated state of the printed art and the foregoing narrative exists, the foregoing narrative is not intended to cure such inconsistency or omission. Rather, applicants would defer to the demonstrated state of the printed art.

SUMMARY

In one aspect, the disclosure pertains to a method of controlling a transmission having a plurality of hydraulic clutches for shifting between one or more transmission ratios. In this aspect, the method comprising executing a shift of the transmission by commanding a decrease of hydraulic pressure to an off-going clutch element to begin disengagement of the clutch and commanding a flow of hydraulic fluid to an on-coming clutch to fill a clutch chamber of the second said hydraulic clutch. The method further entails detecting a pressure rise greater than a predetermined magnitude in the chamber of the second hydraulic clutch and determining based on the detected pressure rise that the clutch chamber is filled. Thereafter a clutch modulation phase is initiated to fully engage the on-coming hydraulic clutch, enabling it to fully accept torque transfer from the off-going clutch element.

In another aspect, the disclosure pertains to a transmission control system for controlling a transmission having a plurality of hydraulic clutches. The system comprises a transmission controller for controlling a flow of hydraulic fluid to an on-coming clutch and an off-going clutch, and a 'solenoid valve' associated with each clutch. Each solenoid valve has a coil element linked to the transmission controller usable to control a flow of hydraulic fluid through the solenoid valve. Each solenoid valve further comprises a fluid inlet, a fluid outlet, and a pressure sensor fixed to the solenoid valve, in fluid communication with the outlet and the clutch chamber. The pressure sensor is adapted to sense a pressure within the solenoid valve and to transmit a signal indicative of a sensed pressure to the transmission controller for causing the transmission controller to modify operation of the solenoid valve.

In yet a further aspect, the disclosure pertains to a solenoid valve for use in a hydraulic transmission, the solenoid valve comprising a valve body, a valve spool, a spring biasing the valve spool, a pressure chamber biasing the valve spool in an opposite direction. The solenoid valve further includes an inlet, an outlet, and a pressure sensor linked to the valve body operable to sense a hydraulic fluid pressure within a cavity of the valve body and to transmit an electrical signal based on the sensed pressure.

DETAILED DESCRIPTION

Figure 1:
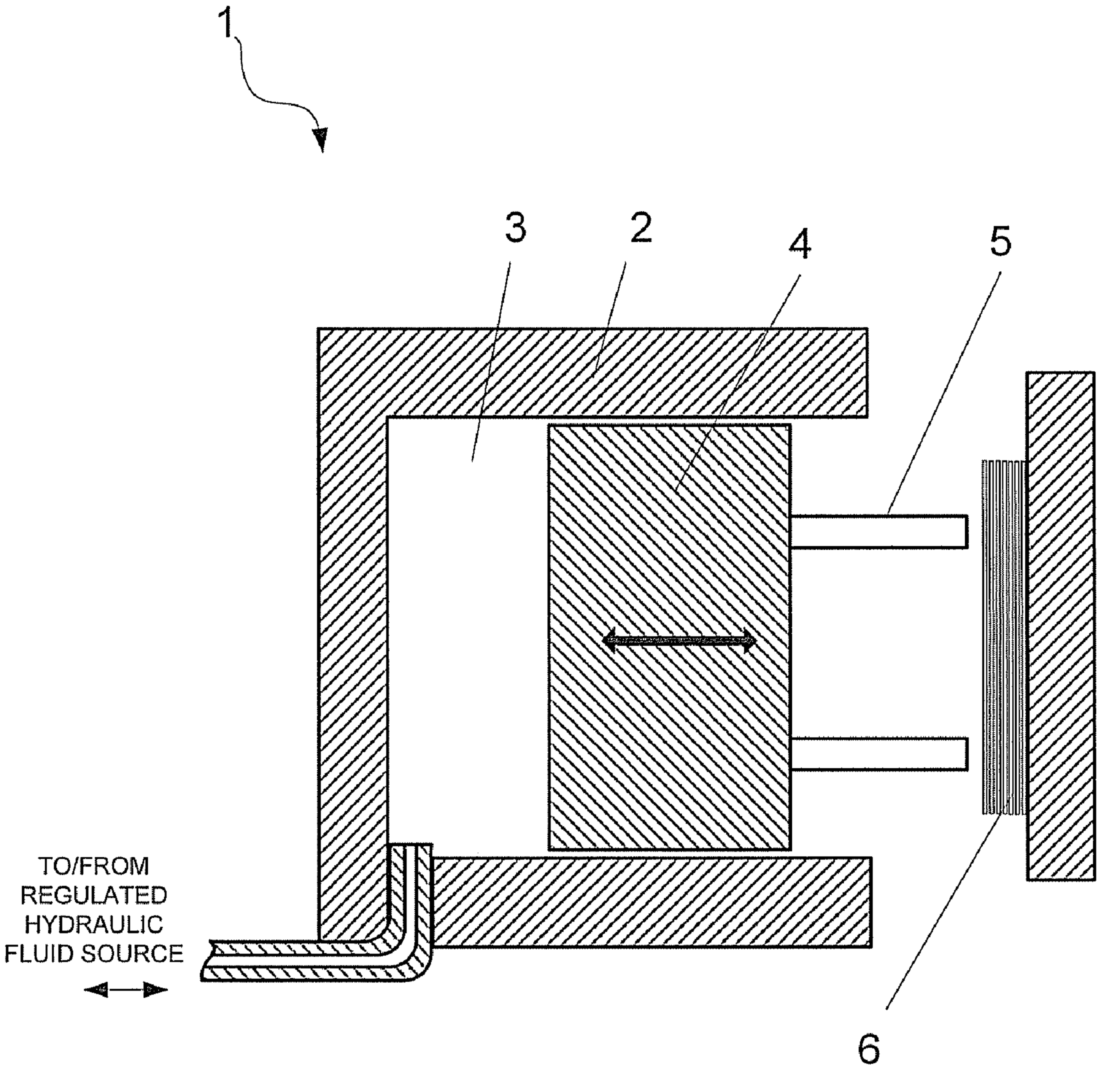
FIG. 1 is a schematic cross-sectional view of a hydraulic clutch controllable in accordance with the disclosed principles.

This disclosure relates to the operation of transmissions that employ hydraulic clutches to control the timing of transmission ratio or range shifts. The disclosed principles provide a mechanism for configuring and controlling a clutch so that the end of fill event of the clutch can be known precisely, improving the shift quality. FIG. 1 is a simplified schematic view of a hydraulic clutch 1. A hydraulic clutch 1 typically comprises a cylinder 2 defining a chamber 3, for retaining hydraulic fluid. The chamber 3 also contains a cooperating fitted piston 4 or other movable member for transmitting the pressure of the fluid from an associated extension 5 to a friction member 6, e.g., a stack of clutch plates. When the fluid volume within the chamber 3 reaches a level that the friction member 6 has moved into its final position, e.g., the stack of clutch plates is fully touching their interleaved transfer elements, not shown, the clutch 1 is said to be "filled." Between the empty and filled state of the clutch 1, the piston 4 may move a short distance, e.g., about 4 mm.

Once the clutch 1 is filled, the continued introduction of fluid into the chamber 3 will cause a pressure rise within the chamber 3. This translates into an increased force by the fluid against the piston 4, and a corresponding increase in friction between the friction member 6 and its counterpart, e.g., the interleaved transfer elements. At a certain pressure level, which may be unique to the clutch 1, the friction between the between the friction member 6 and its counterpart fully overcomes the resistance of a load attached to the counterpart, e.g., a machine transmission etc., and the clutch 1 "locks" so that the friction member 6 and its counterpart move together and torque is fully transferred through the clutch 1.

In the environment of a multi-clutch transmission, the timing with which the clutches lock and unlock is important. For example, if an on-coming clutch locks before an off-going clutch unlocks, severe damage to the transmission or machine may result. Even if damage is avoided, the machine operator may nonetheless experience rough shifting and discomfort.

Typically, a clutch-specific and empirically-determined point in time at which the clutch 1 is thought to be filled is used to change the introduction of fluid into the chamber 3 from one mode, i.e., pulse phase, to another mode, i.e., ramp phase. Thus, the timing of the fill point is important to shift quality. As noted above, existing clutch timing schemes use an estimated fill point because of the difficulty of instrumenting the chamber 3 to detect the actual fill point, as well as other related impediments. In an embodiment of the disclosed principles, a novel system is used to detect, in real time, the filling of a clutch, thus avoiding the estimation and calibration errors inherent in existing static systems.

Figure 2:
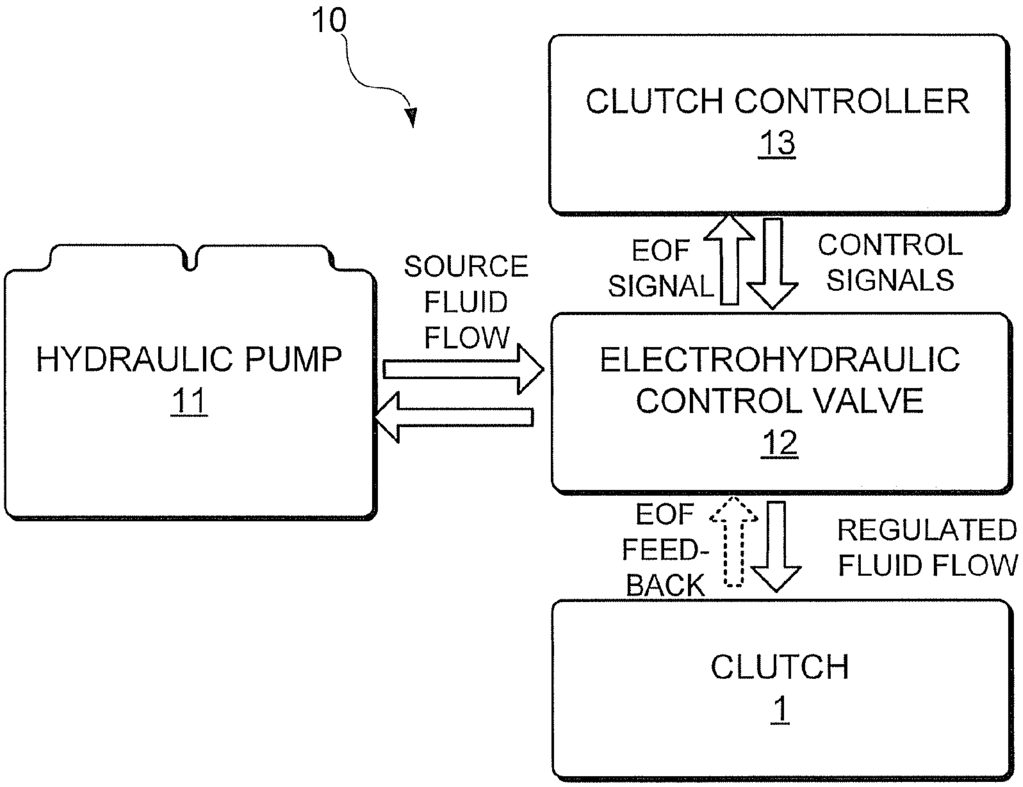
FIG. 2 is a schematic diagram of a hydraulic clutch control system in accordance with the disclosed principles.

In an embodiment, a machine transmission system 10 employs one or more electrohydraulic clutch pressure control (ECPC) valves. An example of an ECPC valve 12 is shown schematically in FIG. 2 within a typical transmission system 10 operating environment. In the illustrated example, the ECPC valve 12 receives an input of pressurized fluid from a fluid source such as a hydraulic pump 11. The pressurized fluid is described herein as hydraulic fluid; however, those of skill in the art will appreciate that any fluid capable of meeting implementation requirements in a given system will be suitable.

The ECPC valve 12 receives electrical control signals, e.g., a current or voltage signal, from a transmission controller 13 to actuate the valve spool which causes the ECPC valve 12 to provide an output of fluid at a pressure set by the control signals to the clutch 1. In this manner, the transmission controller 13 is able to control the pressure of fluid provided to the clutch, and hence to control the operation of the clutch. In an embodiment, the transmission controller 13 controls the clutch 1 so that the clutch fills at one or more first predetermined pressures to avoid a rough "touch up" at the end of fill point, after which the clutch pressure increases to one or more second predetermined pressures, e.g., substantially greater than the one or more first predetermined pressures. In this manner, once the clutch chamber is filled and the clutch is ready to transmit torque, the transmission controller 13 initiates clutch modulation to maximum clamp pressure, which prepares the clutch for the torque transfer phase.

As noted above, the timing of clutch transitions can greatly influence the quality of a shift between transmission ratios. In order to determine more precisely when to switch from a pressure suitable for filling the clutch 1 (i.e., a "clutch fill pressure") to a pressure suitable for locking the clutch 1 (i.e., a "clutch lock pressure"), the transmission controller 13 determines the point in time at which the clutch 1 has completed filling (i.e., the "end of fill point"). In one example, the transmission controller 13 determines the end of fill point by monitoring a pressure in the hydraulic fluid within the ECPC via a pressure switch or transducer. In particular, it has been discovered that at the end of fill point, a perturbation in fluid pressure feeds back from the clutch 1 into the ECPC valve 12, and that this perturbation may be harnessed to identify the end of fill point with precision.

Figure 3:
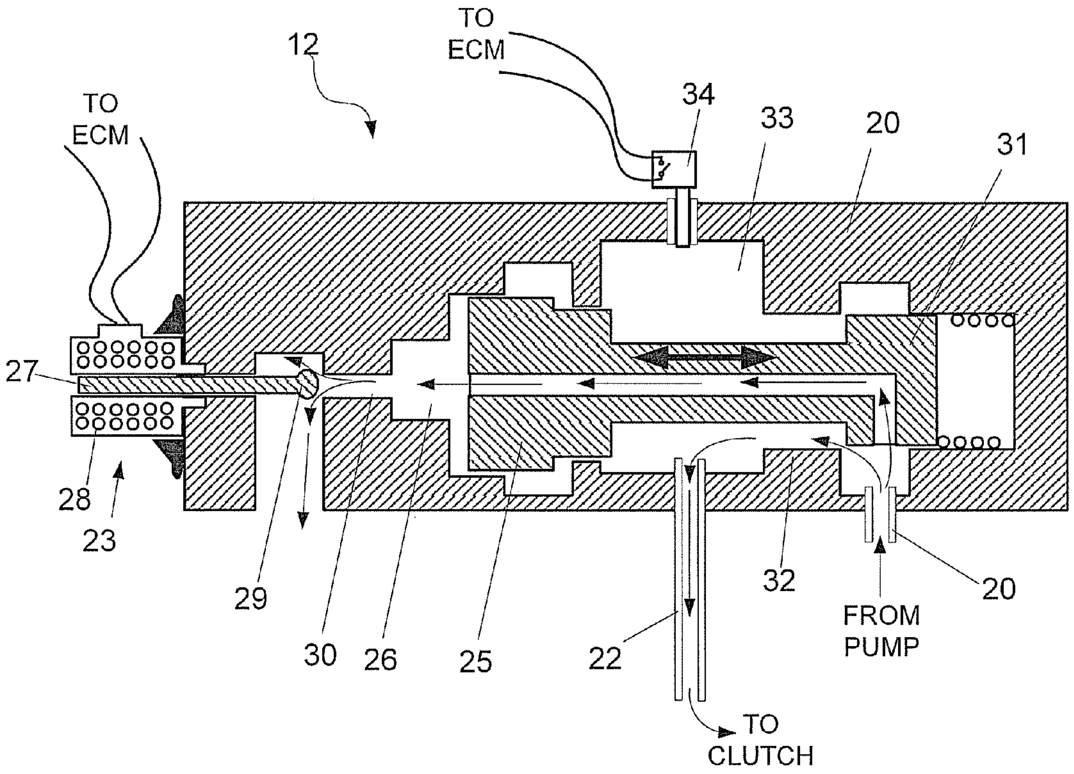
FIG. 3 is a cross-sectional view of an electrohydraulic clutch pressure control valve in accordance with the disclosed principles.

An ECPC implementation consistent with this insight is illustrated schematically in FIG. 3. In overview, the ECPC valve 12 of FIG. 3 comprises a valve body 20 having a plurality of orifices and chambers arranged to regulate a flow of pressurized hydraulic fluid from a source inlet 21 to a clutch outlet 22 responsive to a solenoid 23. The ECPC valve 12 includes a valve spool 24 that moves linearly within the body 20 under the influence of two forces, namely the force of a compression spring 25 as well as an oppositely directed displacement force caused by pressure chamber 26.

The solenoid 23 comprises an actuator 27 within a coil unit 28. When energized, the coil unit 28 forces the actuator 27 toward the body 20 with a force that is at least approximately a function of a current applied to the coil unit 28 of the solenoid 23, e.g., by an electronic control module (ECM), e.g., transmission controller 13. As the actuator 27 is forced toward the body 20, a stop 29 on the actuator 27 cooperates with a pressure chamber orifice 30 to regulate the flow of fluid out of the pressure chamber 26. This in turn regulates a hydraulic pressure on the valve spool 24 to oppose the compression spring 25, thus regulating the linear position of the valve spool 24 within the body 20.

As the valve spool 24 moves within the body 20, a cylindrical projection 31 on the valve spool 24 cooperates with a land 32 on the body 20 to regulate the introduction of fluid from the source inlet 21 into a valve plenum 33 in fluid communication with the clutch outlet 22. As a result of the described interactions, the fluid pressure supplied at the clutch outlet 22 is controllable via a current applied to the coil unit 28 of the solenoid 23 by the transmission controller 13. This allows the transmission controller 13 to control the position and pressure of one or more clutches associated with the ECPC valve 12.

However, as noted above, it is difficult to measure the actual position of clutch components relative to their fully engaged position, e.g., their position when the clutch is fully transferring torque. As such, it is also difficult to coordinate an on-coming clutch with an off -going clutch with sufficient accuracy to avoid suboptimal shift behavior. To overcome this deficiency and to allow real-time positioning of the clutch components based on real-time conditions rather than historical data, the ECPC valve 12 further comprises a pressure switch 34 in fluid communication with the valve plenum 33. The pressure switch 34 may be for example a switch-to-ground (SWG) input that may be either normally on (closed) or normally off (open).

The pressure switch 34 is linked to the transmission controller 13 in order to transmit one or more electrical signals to the controller. In response to the transmitted signal, the transmission controller 13 changes the manner in which it energizes the solenoid 23 in order to optimize the shift timing. In particular, the switch 34 responds to a predetermined pressure change pattern in the valve plenum 33 indicative of the clutch end of fill point. The end of fill point corresponds to the maximum travel of the piston 4, and when this point is reached, the volume of the clutch chamber 3 reaches its maximum and stops. When the clutch chamber 3 suddenly stops expanding at the end of fill point, the fluid flowing within the system continues to flow into the fixed clutch chamber 3 at substantially the same rate for a brief period of time due to its inertia.

This flow imbalance causes a momentary pressure rise or spike in the clutch chamber 3 at the end of fill point, and this pressure spike feeds back into the control side of the ECPC valve 12. As the end of fill pressure spike reaches the ECPC valve 12, the pressure in the valve plenum 33 rises briefly, and the switch 34 detects this rise. At this point, the switch 34 transmits a signal indicative of the pressure spike to the transmission controller 13, and the transmitted signal is interpreted by the transmission controller 13 as signaling the end of fill point.

It has been observed that in one arrangement the end of fill pressure spike may have an amplitude of about 10 psi and last for a duration of about 4 ms. Thus, it is desirable in this embodiment to use a switch that triggers at or below 10 psi. However, it will appreciated that there may be a trade-off between shift quality and sensor cost. The larger the required spike, the rougher the shift could be. However, the lower the required spike, the higher the sensor cost, due to increased resolution. At the same time, the sensitivity of the switch 34 should be such that the switch 34 will not trigger on system noise such as may be present at an amplitude of about 5 psi or less. The sensitivity of the switch 34 may vary depending upon the implementation. In particular, it will be appreciated that an end of fill pressure spike may be greater or less than 10 psi and the system noise level may be greater or less than 5 psi depending upon the system in which the disclosed principles are implemented.

Given the pressure spike duration of about 4 ms, the switch 34 should have a response time low enough to respond on this order of time. In addition, although many ECMs operate with a loop time (time between re-execution of control flow) of about 10 ms, this loop time is too long to ensure that the pressure spike is observed. In particular, if the pressure spike occurs between loops, it may go undetected. For this reason, in an embodiment, the transmission controller 13 loop time is about 2.5 ms or less, ensuring that the pressure spike is detected whenever it occurs.

Despite taking precautions regarding the switch response time and sensitivity and transmission controller 13 loop time, it is possible that the clutch pressure spike will go undetected or that a false trigger will occur prior to the clutch pressure spike. For example, the clutch pressure spike in the clutch chamber 3 may occur at substantially the same time as another source of pressure variation in the control side of the pertinent valve. In such circumstances, the pressure spike from the clutch chamber 3 may not feed back intact to the valve plenum 33, and may thus go undetected. For this reason, in a further embodiment the transmission controller 13 may end the clutch fill phase and begin a clutch modulation phase, i.e., to ensure the torque transfer and lock up the clutch 1, if the clutch fill phase has been ongoing for longer than a clutch-specific empirically predetermined amount of time without detection of an end of fill pressure spike. The predetermined amount of time depends upon the implementation environment, but in an example, the predetermined amount of time is set at about 625 ms. It will be appreciated that the clutch fill time is a function of the clutch volume, as well as the hydraulic fluid temperature and viscosity.

Similarly, to avoid premature triggering of the switch 34, the switch 34 is disabled in an example, or its output ignored, for a predetermined interval after the clutch fill phase begins. This ensures that for most of the fill phase, noise-induced pressure fluctuations in the control side of the pertinent valve will not be able to trigger the switch prematurely. Although the magnitude of the predetermined interval depends upon the implementation environment, the predetermined amount of time is set at about 450 ms in an example.

Figure 4:
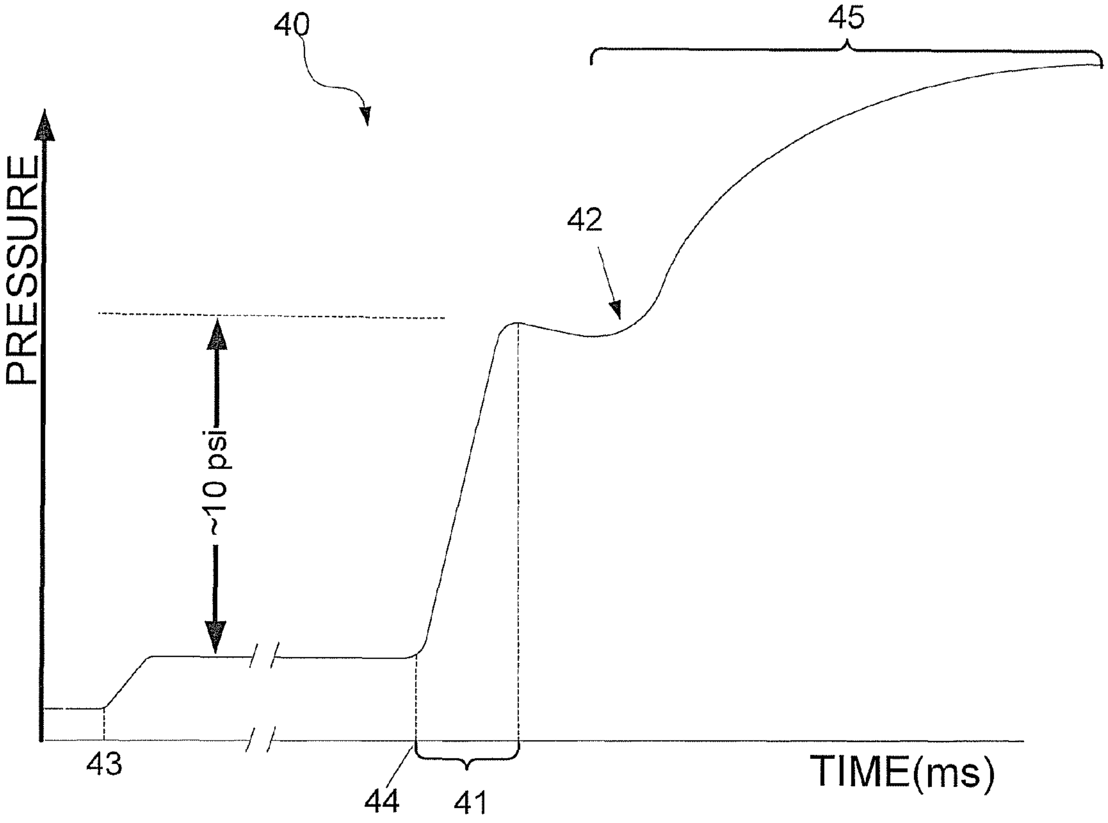
FIG. 4 is an idealized clutch pressure timing plot illustrating a hydraulic pressure spike usable to detect an end of fill in accordance with the disclosed principles.

An example plot 40 showing a representation of a pressure rise and associated pressure spike is shown in FIG. 4. It will be appreciated that the pressure switch 34 will sense the illustrated spike 41 but will typically not sense the rest of the pressure curve 42. However, in an embodiment, a pressure sensor or transducer may be used in lieu of switch 34, in which case such sensor may detect the various pressure levels of the pressure curve 42. The pressure curve 42 represents the hydraulic pressure in the control side of the ECPC valve 12, e.g., within the valve plenum 33, and shows a relatively constant pressure during the fill phase onset 43 to the end of fill point 44, beyond a transient initial stage. At the end of fill point 44, the pressure spikes, e.g., rises on the order of 10 psi, in the manner described above. The spike 41 is transient and subsequently fades as the fluid pressures within the control side equilibrate. As noted above, the pressure is used by the transmission controller 13 to identify the end of fill event and thus to start the next phase, e.g., a modulation phase during period 45.

Figure 5:
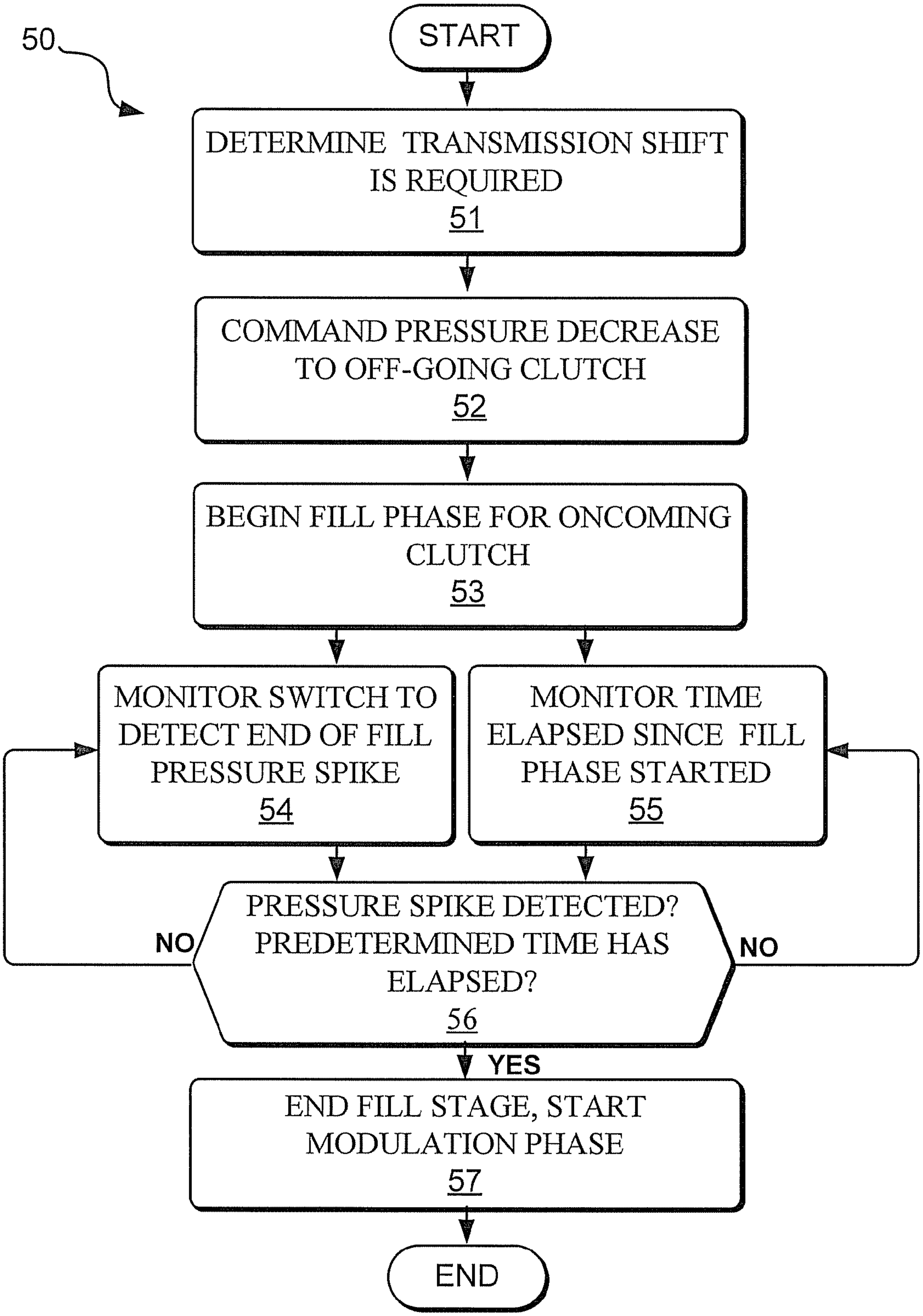
FIG. 5 is a flow chart illustrating a process of a controlling a hydraulic clutch in accordance with the disclosed principles.

The flow chart of FIG. 5 illustrates an exemplary process 50 for clutch management, including end of fill detection, in accordance with the principles described above. For purposes of describing the process 50, it will be assumed that the system architecture is as described in FIGS. 1-3. It will also be assumed that the machine transmission under discussion is executing a two-clutch shift. However, these assumptions are made merely for ease of understanding and are not required conditions for all embodiments.

At stage 51 of the process 50, the transmission controller 13 determines that a transmission shift is required. This requirement may be due to conditions such as increasing or decreasing machine speed and/or load, or operator action, such as increased or decreased use of auxiliary devices, etc. The transmission controller 13 commands a hydraulic pressure decrease to an off-going clutch associated with the current transmission ratio at stage 52.

At stage 53, which is begun at a predetermined time relative to (before, at, or after) the commencement of stage 52, the transmission controller 13 begins a fill phase for an on-coming clutch associated with the new desired transmission ratio. In an embodiment, the fill phase comprises commanding a clutch fill pressure via solenoid 23. During the fill phase, the transmission controller 13 monitors the switch 34 to detect an end of fill pressure spike at stage 54. Simultaneously in stage 55, the transmission controller 13 monitors the time elapsed since the commencement of the fill phase. If at stage 56 the transmission controller 13 determines that either a pressure spike has been detected via switch 34 or a predetermined amount of time has elapsed during the fill phase, the transmission controller 13 moves to stage 57. Otherwise, the process 50 returns to parallel stages 54 and 55.

At stage 57, the transmission controller 13 ceases the fill stage and initiates a clutch modulation phase, i.e., to increase the torque transfer and lock up the clutch 1. Typically this phase entails increasing the clutch pressure until the clutch no longer slips and fully transfers torque. Once the clutch 1 reaches lock up, the shift is complete. It will be appreciated that in the case of multiple on-coming and multiple off-going clutches, the foregoing principles are equally applicable for each clutch.

INDUSTRIAL APPLICABILITY

The present disclosure is applicable to hydraulic transmissions, i.e., transmissions that employ hydraulic clutches to control the timing of transmission ratio or range shifts. In particular, the disclosed principles provide a mechanism for configuring and controlling a clutch 1 so that the end of fill event of the clutch 1 is known precisely, improving the shift quality. This system may be implemented in on-highway or off-highway machines, construction machines, industrial machines, etc. Although many machines that may benefit from the disclosed principles will be machines used at least occasionally for transport of goods, materials, or personnel, it will be appreciated that hydraulic transmissions are used in other contexts as well, and the disclosed teachings are likewise broadly applicable.

Using the disclosed principles, a transmission controller 13, e.g., an ECM, is able to determine the point in time at which a clutch has reached its limit of travel toward engagement. Using this determination, the transmission controller 13 is then able to precisely time the onset of the clutch modulation to avoid delayed or premature lock-up of the clutch 1. In a further aspect, the disclosed system provides a back-up mechanism in the event that the transmission controller 13 for any reason fails to detect the end of fill time. In particular, in an embodiment, the transmission controller 13 initiates the clutch modulation stage if a predetermined period of time has expired from the onset of the fill phase. Moreover, because system noise may trigger the pressure switch 34 used to detect the end of fill time, the controller may disable or ignore the pressure switch 34 for a predetermined amount of time after the onset of the fill phase.

Although the examples described above employ a pressure switch or transducer for each solenoid valve, this is not a requirement for implementing the disclosed principles. Rather, it will be appreciated that the foregoing teachings also apply in environments wherein a single pressure switch or transducer is associated with a plurality of solenoid valves. In an embodiment, a pressure switch or transducer may be multiplexed among two or more solenoid valves.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A method of controlling a transmission having a plurality of hydraulic clutches for shifting between one or more transmission ratios, the method comprising:

determining to execute a shift of the transmission between a first ratio associated with an off-going hydraulic clutch of the transmission, which is currently engaged, and a second ratio associated with an on-coming hydraulic clutch of the transmission, which is currently disengaged;

commanding a decrease of hydraulic pressure to the off-going hydraulic clutch to begin disengagement of the off-going hydraulic clutch;

commanding a flow of hydraulic fluid to the on-coming hydraulic clutch to fill a clutch chamber of the on-coming hydraulic clutch via a clutch fill pressure command;

detecting a pressure spike greater than a predetermined magnitude in the chamber of the on-coming hydraulic clutch; and determining based on the detected pressure spike that the clutch chamber is filled, and thereafter initiating a clutch modulation phase to fully engage the on-coming hydraulic clutch, whereby the on-coming hydraulic clutch is able to fully accept torque transferred from the off-going hydraulic clutch.

2. The method according to claim 1, wherein the transmission further includes an additional clutch other than the off-going clutch and the on-coming clutch, wherein the additional clutch is engaged for both the first ratio and the second ratio.

3. The method according to claim 1, wherein the transmission further includes a plurality of electrohydraulic clutch pressure control valves determined by the number of clutches in the transmission, the valves having a supply side fluid circuit linked to a hydraulic fluid source and a control side fluid circuit linked to the clutch chamber of the on -coming hydraulic clutch, and wherein detecting the pressure spike greater than the predetermined magnitude in the chamber of the on-coming hydraulic clutch further comprises detecting the pressure spike at a sensor in the control side fluid circuit.

4. The method according to claim 3, wherein the sensor in the control side fluid circuit is a pressure transducer.

5. The method according to claim 3, further comprising disabling an output of the sensor for a predetermined interval after commanding the flow of hydraulic fluid to the on-coming hydraulic clutch.

6. The method according to claim 3, further comprising disregarding an output of the sensor for a predetermined interval after commanding the flow of hydraulic fluid to the on-coming hydraulic clutch.

7. The method according to claim 3, wherein the sensor in the control side fluid circuit is a pressure switch.

8. The method according to claim 7, wherein the pressure switch is a switch to ground.

9. A method of controlling a transmission having a plurality of hydraulic clutches for shifting between one or more transmission ratios, the method comprising:

determining to execute a shift of the transmission between a first ratio associated with an off-going hydraulic clutch of the transmission, which is currently engaged, and a second ratio associated with an on-coming hydraulic clutch of the transmission, which is currently disengaged;

commanding a decrease of hydraulic pressure to the off-going hydraulic clutch to begin disengagement of the off-going hydraulic clutch;

commanding a flow of hydraulic fluid to the on-coming hydraulic clutch to fill a clutch chamber of the on-coming hydraulic clutch via a clutch fill pressure command;

detecting a pressure rise greater than a predetermined magnitude in the chamber of the on-coming hydraulic clutch;

determining based on the detected pressure rise that the clutch chamber is filled, and thereafter initiating a clutch modulation phase to fully engage the on-coming hydraulic clutch, whereby the on-coming hydraulic clutch is able to fully accept torque transferred from the off-going hydraulic clutch; and setting a clutch fill timer following commanding the flow of hydraulic fluid to the on-coming hydraulic clutch and prior to detecting a pressure rise in the chamber of the on-coming hydraulic clutch, and initiating the clutch modulation phase if the pressure rise is not detected prior to expiration of the clutch fill timer.

10. The method according to claim 9, wherein the transmission further includes an additional clutch other than the off-going clutch and the on-coming clutch, wherein the additional clutch is engaged for both the first ratio and the second ratio.

11. The method according to claim 9, wherein the transmission further includes a plurality of electrohydraulic clutch pressure control valves determined by the number of clutches in the transmission, the valves having a supply side fluid circuit linked to a hydraulic fluid source and a control side fluid circuit linked to the clutch chamber of the on-coming hydraulic clutch, and wherein detecting a pressure rise greater than a predetermined magnitude in the chamber of the on-coming hydraulic clutch further comprises detecting, at a sensor in the control side fluid circuit, a pressure feedback spike from the clutch chamber of the on-coming hydraulic clutch.

12. The method according to claim 11, wherein the sensor in the control side fluid circuit is a pressure transducer.

13. The method according to claim 11, further comprising disabling an output of the sensor for a predetermined interval after commanding the flow of hydraulic fluid to the on-coming hydraulic clutch.

14. The method according to claim 11, further comprising disregarding an output of the sensor for a predetermined interval after commanding the flow of hydraulic fluid to the on-coming hydraulic clutch.

15. The method according to claim 11, wherein the sensor in the control side fluid circuit is a pressure switch.

16. The method according to claim 15, wherein the pressure switch is a switch to ground.

17. A transmission control system for controlling a transmission having a plurality of hydraulic clutches, the system comprising:

a transmission controller for controlling a flow of hydraulic fluid to an on-coming clutch and an off-going clutch, the controller having a loop time less than about 2.5 ms; and a solenoid valve associated with each of the plurality of hydraulic clutches, each solenoid valve having a coil element linked to the transmission controller and usable to control a flow of hydraulic fluid through the solenoid valve, each solenoid valve further comprising:

an inlet for receiving pressurized fluid from a hydraulic pump;

an outlet for supplying a regulated flow of hydraulic fluid to a clutch chamber of the associated hydraulic clutch; and a pressure sensor fixed to the solenoid valve and being in fluid communication with the outlet and the clutch chamber, wherein the pressure sensor is adapted to sense a pressure within the solenoid valve and to transmit a signal indicative of a sensed pressure to the transmission controller for causing the transmission controller to modify operation of the solenoid valve.

18. The transmission control system according to claim 17, wherein the transmission is a two clutch shifting transmission having a single clutch associated with each of a plurality of transmission ratios, such that the single clutches is required for each transmission ratio and an additional clutch is employed for each of the current and desired transmission ratios.

19. The transmission control system according to claim 17, wherein the solenoid valve includes a valve body and a valve spool having a cylindrical projection that cooperates with a land on the valve body to regulate the introduction of fluid from the inlet to the outlet.

* * * * *